United States Patent
West

(10) Patent No.: US 7,729,508 B2
(45) Date of Patent: Jun. 1, 2010

(54) MODIFYING DATA

(75) Inventor: Matthew J. West, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1119 days.

(21) Appl. No.: 11/329,736

(22) Filed: Jan. 11, 2006

(65) Prior Publication Data

US 2007/0160297 A1    Jul. 12, 2007

(51) Int. Cl.
    *G06K 9/00* (2006.01)
(52) U.S. Cl. .................... 382/100; 713/176
(58) Field of Classification Search ........... 382/100, 382/232; 380/54, 210, 252, 287; 713/176; 704/200.1, 273; 381/73.1; 348/460, 463
    See application file for complete search history.

(56) References Cited

U.S. PATENT DOCUMENTS

| | | | |
|---|---|---|---|
| 5,841,978 A | 11/1998 | Rhoads | |
| 6,341,350 B1 | 1/2002 | Miyahara | |
| 6,385,329 B1 * | 5/2002 | Sharma et al. | 382/100 |
| 6,463,162 B1 * | 10/2002 | Vora | 382/100 |
| 6,507,618 B1 | 1/2003 | Wee et al. | |
| 6,687,384 B1 | 2/2004 | Isnardi | |
| 6,901,862 B2 | 6/2005 | Yamaguchi et al. | |
| 6,963,655 B1 * | 11/2005 | Tonegawa et al. | 382/100 |
| 2001/0010729 A1 | 8/2001 | Kamijoh et al. | |
| 2002/0114490 A1 | 8/2002 | Taniguchi et al. | |
| 2003/0099373 A1 | 5/2003 | Joo et al. | |
| 2003/0133591 A1 | 7/2003 | Watanabe et al. | |
| 2004/0047489 A1 | 3/2004 | Seo et al. | |
| 2004/0131229 A1 | 7/2004 | Acharya et al. | |
| 2004/0184612 A1 | 9/2004 | Kohiyama et al. | |
| 2005/0280720 A1 | 12/2005 | Kwon | |

FOREIGN PATENT DOCUMENTS

EP    1204277    5/2002

OTHER PUBLICATIONS

Po-Chyi Su, Digital watermarking on EBCOT compressed images, Jul. 20, 1999, SPIE, vol. 3808, 313.*
Hartung F et al: "Copyright Protection in Video Delivery Networks by Watermarking of Pre-Compressed Video" May 21, 2007, Proceedings of the European Conference on Multimedia Applications, Services and Tech.

* cited by examiner

*Primary Examiner*—Anand Bhatnagar

(57) ABSTRACT

Embodiments of modifying data are disclosed.

11 Claims, 6 Drawing Sheets

MODIFYING DATA

BACKGROUND

Digital patterning embeds certain additional digital data in particular portions of an original data set. This approach can be slow, because it may include the processing of the original data set in uncompressed form. Since this approach embeds additional digital data, it may generate a modified digital data set that is larger than the original digital data set, making the modified digital data set more difficult to store and transmit.

BRIEF DESCRIPTION OF THE DRAWINGS

FIGS. 5A-5D are charts illustrating various digital data, suitable for use with embodiments of the present disclosure.

FIG. 5E is a chart illustrating a template based on a subtractive digital algorithm, according to embodiments of the present disclosure.

FIGS. 6A-6D are charts illustrating various digital data searched by using a template, according to embodiments of the present disclosure.

DETAILED DESCRIPTION

Embodiments of the present disclosure include methods, computer readable media, systems, and computing devices for modifying data. For example, one method embodiment includes selecting a portion of a compressed data set to be modified, by using an algorithm. The method includes modifying data of the portion of the compressed data set, to form a modified compressed data set having a pattern imperceptible to unaided human sensory perception but identifiable by processing the modified compressed data set using the algorithm.

According to various embodiments of the present disclosure, program instructions can execute to generate a modified digital data set that includes a particular digital pattern that is at least substantially imperceptible to unaided human sensory perception (referred to herein as imperceptible) but identifiable by a computer device. As used throughout this present disclosure, data set includes open ended data sets (e.g. streaming data) as well as closed ended data sets (e.g. files). In such embodiments, an original digital data set can be digitally patterned by using digital computer processing to delete certain digital data in particular portions of the original digital data set. This identifiable pattern of modified data can be an additional communication that can be incorporated into digital data by modifying a portion of the digital data.

Such embodiments can be fast, because the process can be accomplished on an original digital data set in compressed form. With respect to embodiments that delete data, these embodiments can generate a modified digital data set that is smaller than the original digital data set, making the modified digital data set easier to store and transmit. Furthermore, some embodiments do not utilize additional downstream processing to execute the modified digital data in an artistic form intended for human sensory perception.

The embodiments described herein can be performed by software and/or firmware (i.e., computer executable instructions), hardware, application modules, and the like, executable and/or resident on the systems and devices shown herein or otherwise. The embodiments of the present disclosure are not limited to any particular operating environment or to instructions written in a particular programming language. Software, firmware, and/or processing modules, suitable for carrying out embodiments of the present disclosure, can be resident in one or more devices or locations. Processing modules can include separate modules connected together or include several modules on an application specific integrated circuit (ASIC).

Figure 1:
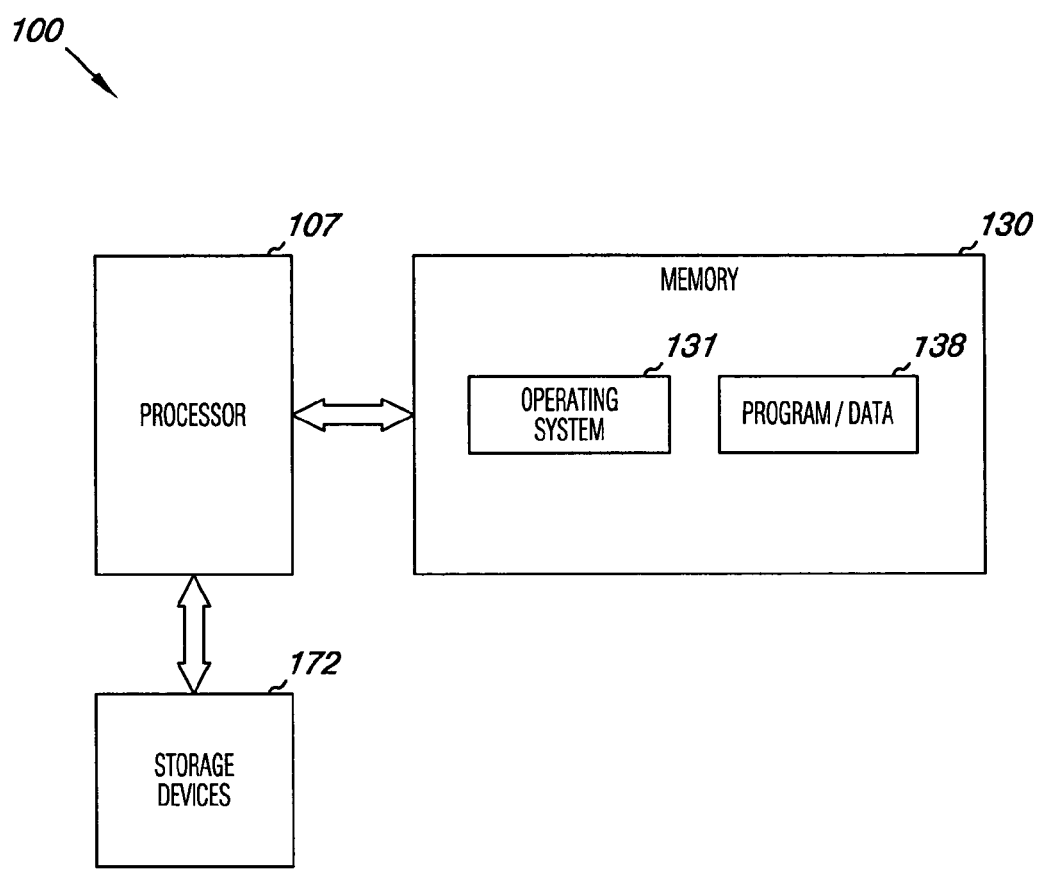
FIG. 1 illustrates an example computing device, suitable for implementing embodiments of the present disclosure.

FIG. 1 illustrates an example computing device 100, suitable to implement embodiments of the present disclosure. The example computing device 100 illustrates a processor 107, memory 130, and one or more storage devices (e.g., floppy disks, CDs, DVDs, hard drives, removable memory, etc.), shown generally as 172.

The processor 107 represents a processing unit of various architectures. Embodiments of the disclosure can be implemented in a multi-processor or single processor system or computing device. Embodiments described herein can similarly be implemented in a distributed computing network environment. The embodiments are not limited to the examples given herein.

Memory 130 represents one or more mechanisms for storing information. For example, memory 130 may include non-volatile and/or volatile memory types. Examples of these memory types include flash memory, read only memory (ROM), random access memory (RAM), etc. Memory 130 may be loaded with an operating system (OS) 131, e.g., in ROM. Memory 130 may also be loaded with programs and data 138, e.g. in RAM. A basic input/output system (BIOS) can be stored in ROM in memory 130. Examples of operating systems include, but are not limited to, Windows, Mac, Unix, Linux, etc. Such executable instructions (e.g., sets of instructions including application programs and operating systems) can be executed on the processor 107 and the processor 107 and memory 130 are associated to accomplish such execution.

Storage devices 172 can include floppy disks, CDs, DVDs, hard drives, removable memory, etc. Storage devices typically are used to allow information to be moved from one computing device to another. Embodiments, however, are not limited to these examples.

Figure 2:
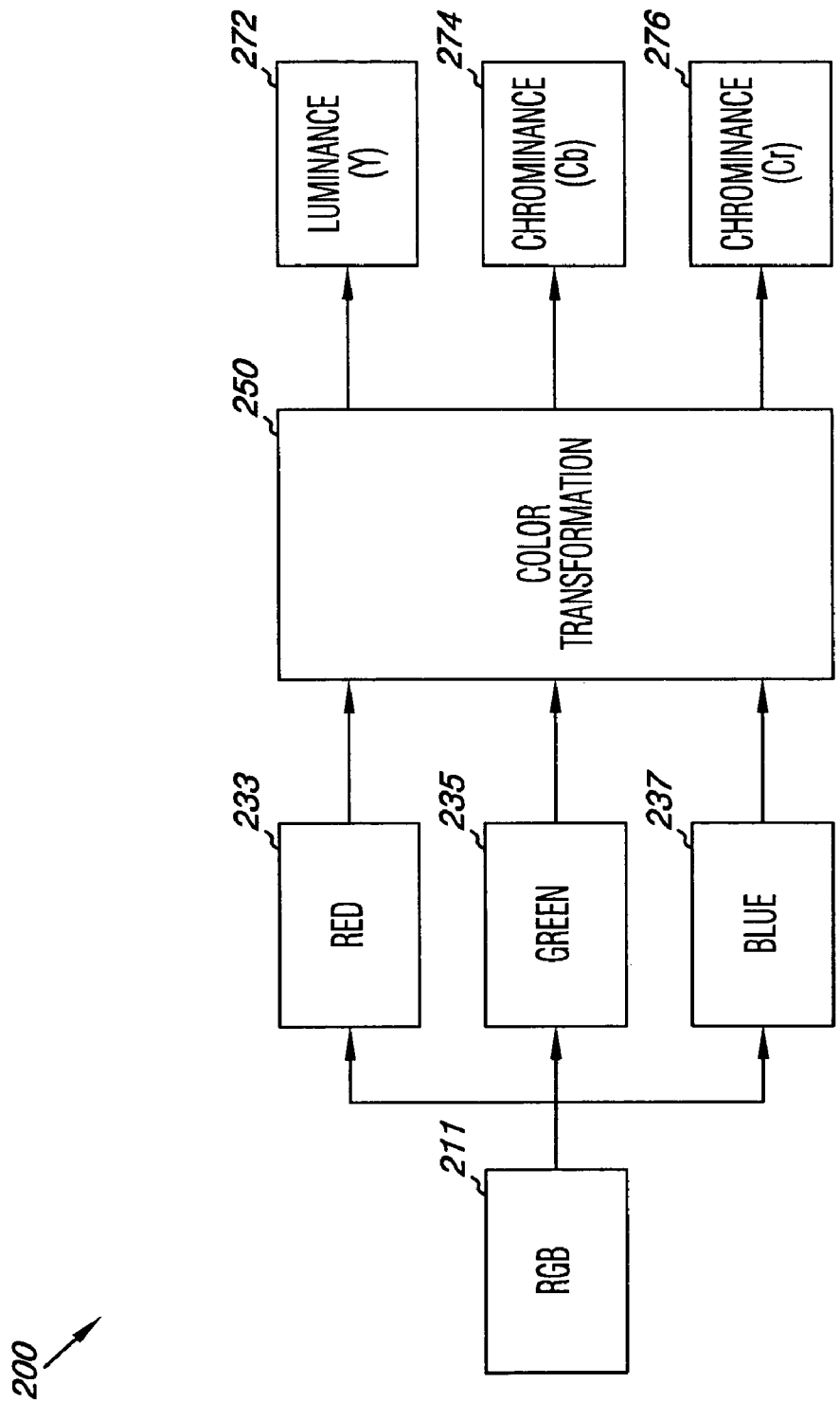
FIG. 2 is a flowchart illustrating an exemplary color transformation for digital data, suitable for use with embodiments of the present disclosure.

FIG. 2 is a flowchart 200 illustrating an exemplary color transformation for digital data, suitable for use with embodiments of the present disclosure. Program instructions can execute to perform this exemplary color transformation for digital video data or for digital image data. In such digital data, color images can be represented in red-green-blue (RGB) format. Program instructions can execute to separate RGB digital data 211 into a red (R) component 233, a green (G) component 235, and a blue (B) component 237 of digital data.

In a color transformation 250, program instructions can execute to transform the separate red, green, and blue components into a luminance (Y) component 272, a chrominance blue (Cb) component 274, and a chrominance red (Cr) component 276 of digital data. Such color transformation methods can be used to format some data set types for compression, since Y, Cb, and Cr components can be independently compressed more easily than R, G, and B components. This exemplary color transformation can be used in preparation for a JPEG2000 compression of digital data, for example. Program instructions can execute to compress the luminance component 272, the chrominance blue component 274, and the chrominance red component 276, decompress each component, and then combine them into YCbCr digital data.

Program instructions can execute to create a particular digital pattern on one or more compressed components of digital data (e.g., video or image data). The pattern created can be a random (e.g., distributed in an unpredictable manner) or structured (e.g., distributed in a predictable manner) form that can be recognized by an algorithm designed to identify a modification within a data set and to determine whether the modification indicates an unauthorized copy of the original data set. For example, program instructions can execute to create a particular digital pattern on one or more of the luminance component 272, the chrominance blue component 274, and/or the chrominance red component 276. These program instructions can use a digital algorithm to select a portion of digital data from one or more compressed components of digital data to be modified. In some embodiments, the program instructions can use a subtractive digital algorithm to select a portion of digital data from one or more compressed components of digital data to be deleted. Once selected, program instructions can also execute to modify the portion, to form modified compressed digital data that includes a particular digital pattern based on the digital algorithm, as described further in connection with FIGS. 5-8.

In some embodiments of the present disclosure, the particular digital pattern can be a subtractive digital pattern that is imperceptible or at least substantially imperceptible by unaided human sensory perception (referred to herein as a subtractive imperceptible digital pattern). As an example, program instructions can execute to use a subtractive imperceptible digital patterning algorithm to select and delete digital data (e.g., a word) of a chrominance blue component from one or more frames of a compressed digital data set. When this patterned digital data set is executed in a form intended for human sensory perception, one or more frames of the resulting images, for example, can be slightly softer than images that would result from an original version of the digital data set that did not include the subtractive imperceptible digital pattern. However, this slight softness can be imperceptible or at least substantially imperceptible to ordinary unaided human sensory perception. Thus, in this example, the subtractive digital pattern is a subtractive imperceptible digital pattern.

Figure 3:
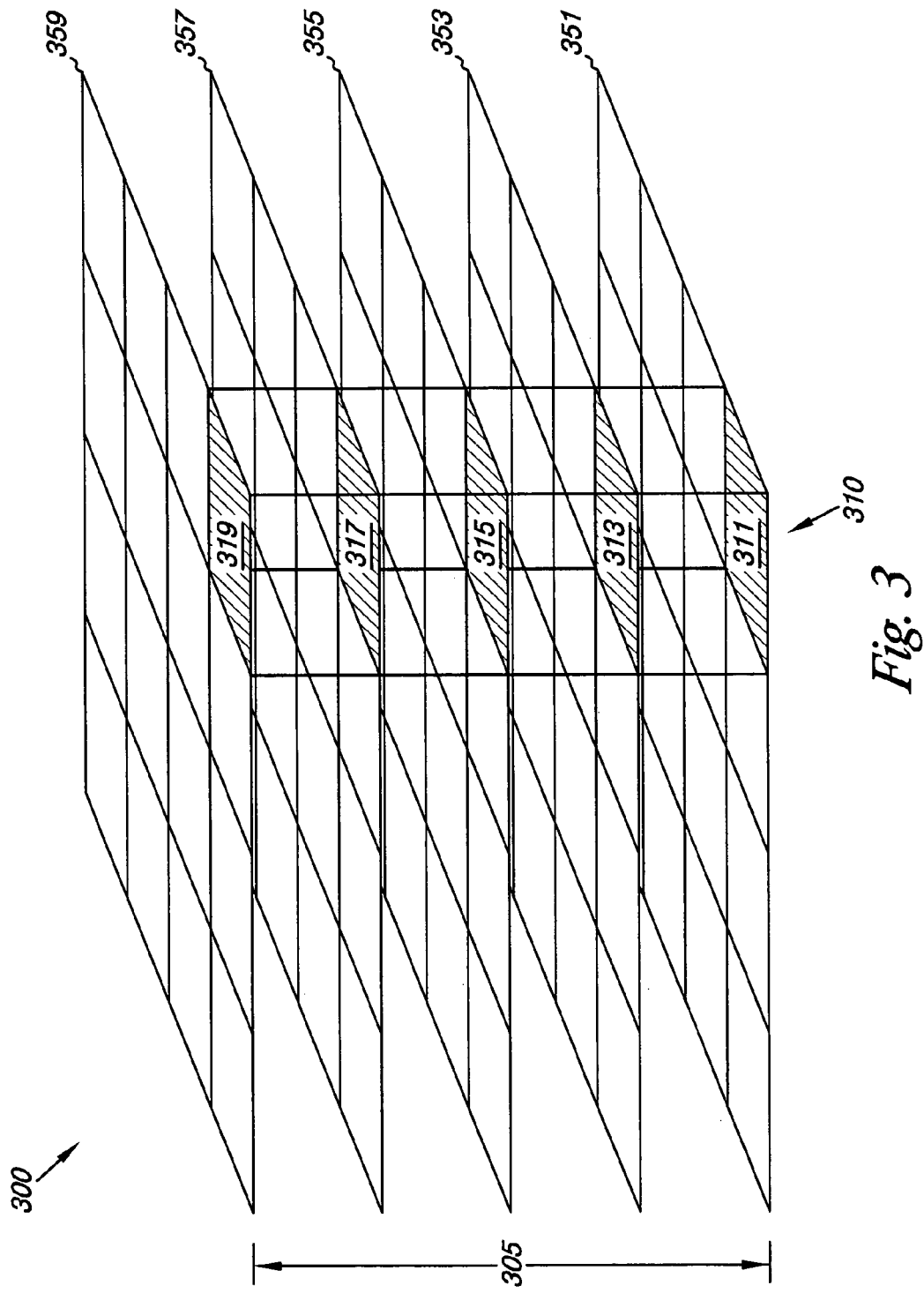
FIG. 3 is a diagram illustrating exemplary encoding of bit planes of digital video data, suitable for use with embodiments of the present disclosure.

FIG. 3 is a diagram illustrating exemplary encoding of bit planes of digital video data, suitable for use with embodiments of the present disclosure. Program instructions can execute to perform this exemplary encoding of bit planes of digital video data. In digital video data, code-blocks of digital video data can be encoded by bit planes. Encoded digital bit planes can typically be easily compressed and, as a result, encoding of bit planes can be used in preparation for compressing digital video data. For example, encoding of bit planes can be used in preparation for a JPEG2000 compression of digital video data. In such embodiments, program instructions can execute to encode a number of wavelet coefficients (e.g., 310) for digital video data into a group of bit planes 300, (e.g., a first bit plane 351, a second bit plane 353, a third bit plane 355, a fourth bit plane 357, and a fifth bit plane 359). In various embodiments, a group of bit planes can include more or fewer bit planes than illustrated in FIG. 3.

In the embodiment illustrated in FIG. 3, each of the bit planes 351 through 359 includes an array of digital data bits. In the group of bit planes 300, each wavelet coefficient includes a digital data bit from each of the bit planes 351 through 359. For example, a wavelet coefficient 310 includes digital data bit 311 from the first bit plane 351, digital data bit 313 from the second bit plane 353, digital data bit 315 from the third bit plane 355, digital data bit 317 from the fourth bit plane 357, and digital data bit 319 from the fifth bit plane 359. In the embodiment illustrated in FIG. 3, the wavelet coefficient 310 has a coefficient bit depth 305 of five, since it includes digital data bits from five bit planes. In the wavelet coefficient 310, digital data bit 311 is a least significant bit and digital data bit 319 is a most significant bit. Accordingly, the first bit plane 351 is considered to be a lower order bit plane and the fourth bit plane 359 is considered to be a higher order bit plane.

Program instructions can execute to perform digital patterning on one or more bit planes of digital data. For example, program instructions can execute to perform subtractive digital patterning on one or more of the bit planes 351 through 359. These program instructions can use a subtractive digital patterning algorithm to select a portion of digital data from one or more bit planes of digital video data to be deleted. Once selected, program instructions can also execute to delete the portion, to form modified compressed digital data that includes a digital pattern based on the digital patterning algorithm, as described further in connection with FIGS. 5-8.

In some embodiments of the present disclosure, the digital pattern can be an imperceptible digital pattern. As an example, program instructions can execute to use an imperceptible digital patterning algorithm to select and modify all of the digital data bits in a lower order bit plane of a compressed digital data set. When this patterned digital data set is executed in a form intended for human sensory perception, the resulting images can be slightly less sharp than images that would result from an original version of the digital data set that did not include the imperceptible digital pattern. However, this slight reduction in sharpness can be imperceptible or at least substantially imperceptible to ordinary unaided human sensory perception. Thus, in this example, the digital pattern is an imperceptible digital pattern.

In some embodiments of the present disclosure, program instructions can execute to perform digital patterning on various forms of digital data. In some embodiments, various forms of digital data for JPEG2000 compression can be digitally patterned, including, for example, tiles, sub-bands, precincts, code blocks, and layers, among others. In JPEG2000 compression, a layer is a collection of digital data bits encoded from one or more bit planes. A low spatial frequency layer is a layer in which bit values rarely change for digital data bits in a collection. As an example, program instructions can execute to use an imperceptible digital patterning algorithm to select and modify a portion of digital data bits in a low spatial frequency layer.

Figure 4:
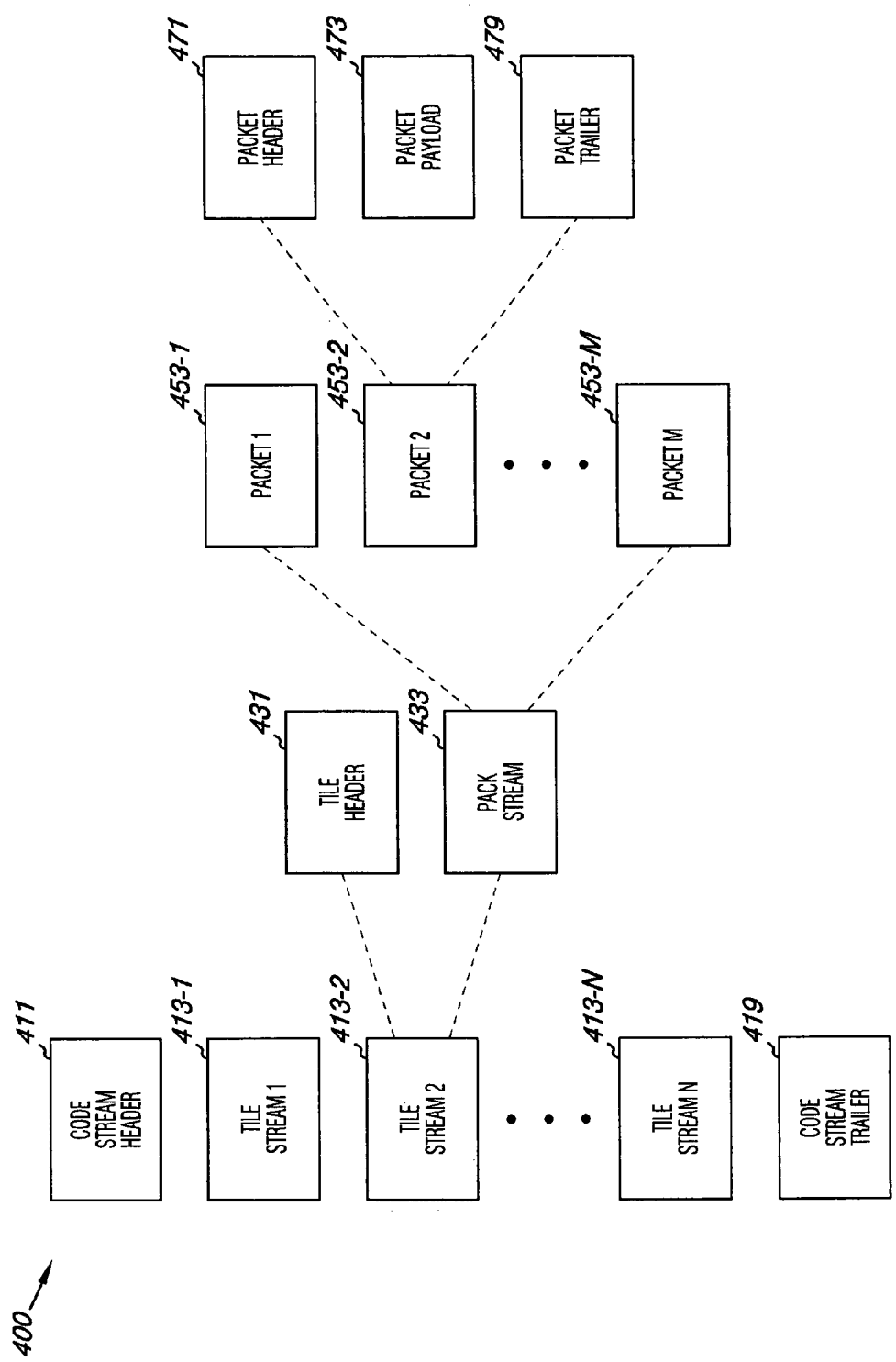
FIG. 4 is a diagram illustrating an exemplary code stream of digital data, suitable for use with embodiments of the present disclosure.

FIG. 4 is a diagram illustrating an exemplary code stream of digital data, suitable for use with embodiments of the present disclosure. A code stream is a data format that can be used to transmit digital data. Program instructions can execute to form a code stream of digital data, for example, for digital video data or digital image data. As an example, a code stream of digital data can be used for a JPEG2000 compression of digital video data.

Program instructions can execute to form a code stream 400 of compressed digital data that includes a code stream header 411, a first tile stream 413-1, a second tile stream 413-2, an Nth tile stream 413-N ("N" representing a scalable number), and a code stream trailer 419. The code stream header 411 can be used as a data field that can include information about the digital data in the code stream 400. The code stream trailer 419 can be used as a marker that can include digital data indicating an end of the code stream 400. In some embodiments, a code stream trailer can be a data field that includes information about how a computer can handle digital data in a code stream.

Program instructions can also execute to form the tile streams 413-1 through 413-N. In the embodiment of FIG. 4, each of these tile streams is a subset of the code stream 400. Each tile stream in the code stream 400 includes a tile header and a pack stream, which are shown in FIG. 4 for the second tile stream 413-2. Each tile stream (e.g., second tile stream 413-2) includes a tile header 431 and a pack stream 433. The tile header 431 can be a data field that includes information about the digital data in this particular tile stream (e.g., second tile stream 413-2).

Program instructions can execute to form the pack stream 433. The pack stream can include a first packet 453, a second packet 453-2, and an Mth packet 457 ("M" representing a scalable number). In such embodiments, each packet in the pack stream can include a packet header, a packet payload, and a packet trailer, which are shown in FIG. 4 for the second packet 453-2. In this embodiment, the second packet 453-2 includes a packet header 471, a packet payload 473, and a packet trailer 479.

The packet header 471 can be a data field that includes information about the digital data in the packet payload 473. The packet trailer 479 can be a marker that includes digital data indicating an end of the second packet 453-2. In some embodiments, a packet trailer can be a data field that includes information about how a computer can handle digital data in a packet payload.

The packet payload 473 can include the digital data originally being transmitted by the code stream 400. In the embodiment of FIG. 4, the digital data in the packet payload 473 can be compressed digital video data, for example. In various embodiments of the present disclosure, digital data in a packet payload can also be compressed digital image data, other forms of compressed digital data, or uncompressed digital data.

Program instructions can execute to perform digital patterning on digital data in one or more packet payloads of a code stream. For example, program instructions can execute to perform digital patterning on compressed digital data in the packet payload 473 of the code stream 400. These program instructions can use a digital patterning algorithm (e.g., subtractive or replacement type algorithm) to select a portion of digital data from one or more packet payloads to be modified. Once selected, program instructions can also execute to modify the portion, to form modified compressed digital data that includes a digital pattern based on the digital patterning algorithm, as described further in connection with FIGS. 5-8.

FIGS. 5-6 are charts illustrating various digital data and templates. The digital data in these charts are intended to represent compressed digital video data. However, in various embodiments, the digital data in the charts of FIGS. 5-6 can also illustrate compressed digital image data, other forms of compressed digital data, or uncompressed digital data.

Each chart in these figures includes an array of digital data fields marked with columns A-H and rows 1-8, which refer to particular digital data fields. In the embodiments of FIGS. 5-6, a one or a zero in a digital data field indicates a presence of original digital data in that particular digital data field, hatching in a digital data field indicates an absence of digital data in that particular digital data field, and a letter in a digital data field indicate a presence of replacement digital data in that particular digital data field.

FIGS. 5-6 are intended to illustrate concepts related to digital patterning. These figures are not intended to limit embodiments of the present disclosure to any particular original digital data, replacement digital data, digital pattern, digital patterning algorithm, or template.

Figures 5A, 5B, 5C, 5D, 5E, 6A, 6B, 6C, 6D:
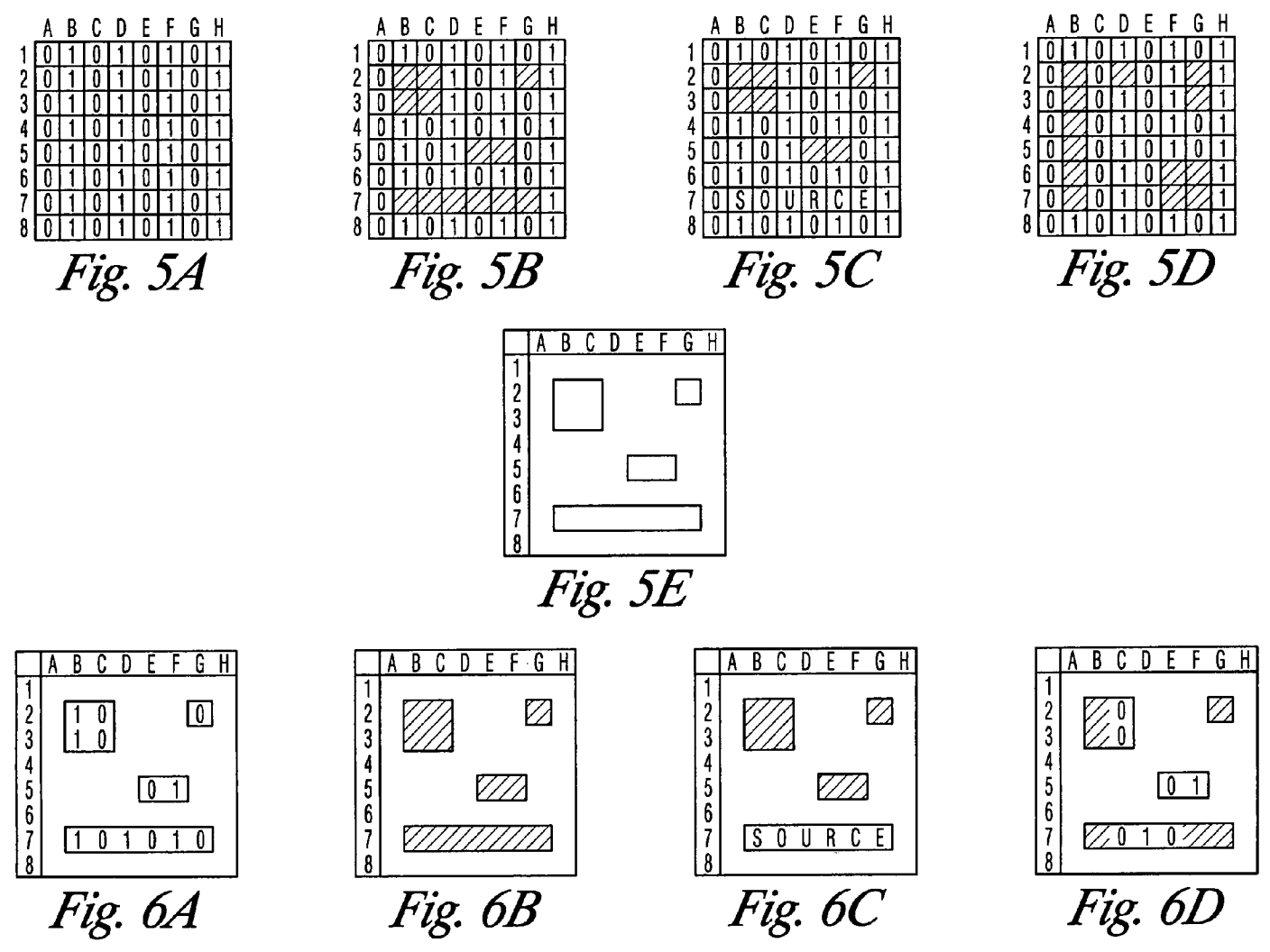

FIG. 5A is a chart illustrating digital data, suitable for use with embodiments of the present disclosure. In the chart of FIG. 5A, digital data is present in each digital data field of the array. The digital data in the chart of FIG. 5A is intended to represent compressed digital video data from an original data set that does not include a digital pattern.

FIG. 5B is a chart illustrating digital data with a subtractive digital pattern, according to embodiments of the present disclosure. In the chart of FIG. 5B, digital data is present in some digital data fields of the array. Digital data is absent in some digital data fields of the array, including B2-B3, C2-C3, E5-F5, G2, and B7-G7. The digital data in the chart of FIG. 5B is intended to represent compressed digital video data from a modified data set that includes a subtractive digital pattern.

Program instructions can execute to generate a modified digital data set that includes a digital pattern from an original digital data set. Program instructions can execute to receive a digital data set for digital patterning. In embodiments of the present disclosure, this data set can be a compressed digital video data set or a compressed digital image data, among other types of digital data sets.

In some embodiments, program instructions can execute to select a portion of an original digital data set to be deleted, by using a subtractive patterning algorithm. The portion to be deleted can include one or more sections of digital data.

Sections of digital data to be modified can have one or more particular attributes, such as size, location, and distribution, among other attributes. Program instructions can execute to determine these particular attributes when a portion to be modified is selected. The determination of such particular attributes can form an additional communication that can be incorporated into digital data. As a result, a patterning algorithm can be based on one or more of particular attributes of digital data to be modified.

In embodiments of the present disclosure, program instructions can execute to use a patterning algorithm based on sizes of a number of sections of digital data to be modified. The sizes of the number of sections of digital data, in some embodiments, can be uniform, such as sections that are each one word long. Word length is typically defined by the operating system on a computing device and accordingly, word size can vary from one computing device to another. In various embodiments, the sizes of the number of sections of digital data, can be varied, for example, a one word section, followed by a two word section, followed by a three word section, and so on.

The sizes of the number of sections of digital data, in various embodiments, can be random. For example, program instructions can execute to use a random number generator to generate random section lengths between one and ten words. In some embodiments, the sizes of the number of sections of digital data, can be patterned using a pattern, such as a one word section followed by a two word section, followed by a one word section, followed by a two word section, and so on. A patterning algorithm can also be based on various combinations of uniform, varied, random, and patterned sizes, of a number of sections of digital data to be modified.

In digital patterning, a selection of sizes of digital data to be modified can be a free choice within certain size parameters. A subtractive digital pattern based on digital data deletions that are too small, for example, may become lost in digital data signal noise. However, a digital pattern based on digital data deletions that are too large may significantly degrade the digital data. Within these size parameters, suitable sizes of digital data to be deleted can be selected, for subtractive digital patterning. Additionally, in some embodiments, suitable sizes of digital data to be replaced can be selected, for replacement digital patterning. In replacement digital patterning, a number of digital data values can be replaced with other values. In this way, the size of the data set can be the same, but the data can be different, thereby allowing a computing device to identify the differences.

Program instructions can execute, in various embodiments of the present disclosure, to use a patterning algorithm based on locations of a number of sections of digital data to be modified. The locations of the number of sections of digital data, in some embodiments, can be uniform, such as sections located in the same order of bit plane.

In various embodiments, the locations of the number of sections of digital data, can be varied, for example, a section located one word into a packet payload, followed by a section located two words into a packet payload, followed by a section located three words into a packet payload, and so on. The locations of the number of sections of digital data, in various embodiments, can be random, for example, program instructions can execute to use a random number generator to generate random numbers that locate sections at random distances from a packet header.

In some embodiments, the locations of the number of sections of digital data, can be patterned using a pattern, such as a location at a front of a packet payload, followed by a location at a back of a packet payload, followed by a location at a front of a packet payload, and so on. A patterning algorithm can also be based on various combinations of uniform, varied, random, and patterned locations, of a number of sections of digital data to be modified.

In various embodiments, the number of sections to be modified can be distributed substantially throughout an original digital data set. In such embodiments, the pattern of the distribution can be random or structured.

A digital pattern that is distributed substantially throughout digital data can be robust in resisting removal of the pattern. A patterning algorithm can also be based on various combinations of locations, sizes, and distributions, of a number of sections of digital data to be modified, although embodiments of the present disclosure are not limited to these examples.

Once a portion of an original digital data set is selected for modification by using a digital patterning algorithm, program instructions can execute to modify the portion of the original digital data set, to form a modified digital data set that includes a digital pattern based on the subtractive digital patterning algorithm. In various embodiments, program instructions can execute to perform this selection and modification to form a modified digital data set that includes an imperceptible digital pattern.

In the embodiment of FIG. 5B, program instructions have executed to delete a portion of an original compressed digital video data set to generate modified compressed digital video data that includes a subtractive digital pattern. The digital data in the chart of FIG. 5B is from this modified data set.

FIG. 5C is a chart illustrating digital data with another digital pattern, according to embodiments of the present disclosure. The digital data in the chart of FIG. 5C is intended to represent compressed digital video data from a modified data set that includes a subtractive digital pattern and replacement digital data. Accordingly, in the chart of FIG. 5C, digital data is present in some digital data fields in the array, digital data is absent in some digital data fields in the array, including B2-B3, C2-C3, E5-F5, and G2, and replacement digital data is present in some digital data fields in the array, including B7-G7.

Program instructions can execute to add various replacement digital data to a modified digital data set with respect to a digital pattern. In embodiments of the present disclosure, program instructions can execute to add various replacement digital data to at least some of a portion of a modified digital data set that has been deleted based upon digital patterning. Program instructions can execute, in various embodiments of the present disclosure, to add various replacement digital data to a modified digital data set with a digital pattern by overwriting at least some digital data in the modified digital data set. In some embodiments of digital patterning, program instructions can execute to add replacement data to one or more deleted portions and/or overwrite one or more portions of digital data.

Replacement digital data can include data about a source of an original digital data set. For example, source information can include a name or number, used to identify a publisher or distributor of an original digital data set. In the embodiment of FIG. 5C, program instructions have executed to delete a portion of an original compressed digital video data set to generate a modified compressed digital video data set that includes a subtractive digital pattern.

Further, program instructions have also executed to add replacement digital data to at least some of the digital data fields. In the embodiment of FIG. 5C, the letters S-O-U-R-C-E- in B7-G7 illustrates digital data about a source of the original compressed digital video data set from which the modified compressed digital video data set is generated.

FIG. 5D is a chart illustrating other digital data, suitable for use with embodiments of the present disclosure. In the chart of FIG. 5D, digital data is present in some digital data fields in the array, digital data is absent in some digital data fields in the array, including B2-B7, D2, F6-F7, G1-G2, and G6-G7, and replacement digital data is present in some digital data fields in the array, including B7-G7. The digital data in the chart of FIG. 5D is intended to represent compressed digital video data from a data set that does not include a subtractive digital pattern.

FIG. 5E is a chart illustrating a template based on a digital patterning algorithm, according to embodiments of the present disclosure. A template based on a digital patterning algorithm can be used to search a digital data set for a digital pattern based on the digital patterning algorithm. In the embodiment of FIG. 5E, blank rectangles on the template represent particular search locations for a portion of digital data set, which can be searched by using the template.

A publicly available template based on a digital patterning algorithm can be used to determine whether or not a digital data set includes a digital pattern. In various embodiments, a privately held template based on a digital patterning algorithm can be used to extract a digital pattern from a modified digital data set that includes the digital pattern. The template in the embodiment of FIG. 5E, is based on a digital patterning algorithm used to digitally pattern digital data in the embodiments of FIGS. 5B and 5C.

Program instructions can execute to search digital data for a number of sections of modified digital data by using a template based on a digital patterning algorithm. Program instructions can also execute to determine whether or not digital data includes a digital pattern based on a digital patterning algorithm by using a result of searching the digital data. In some embodiments of the present disclosure, program instructions can execute to search digital data set for replacement digital data by using a template based on an imperceptible digital patterning algorithm. Program instructions can also execute to determine a source of the digital video data set by using replacement digital data.

In embodiments of the present disclosure, program instructions can execute to search compressed digital data by using a template and determine whether or not the compressed digital data includes a digital pattern. In some embodiments, the compressed digital data can be compressed digital video data or compressed digital image data, although embodiments of the present disclosure are not limited to such digital data.

FIG. 6A is a chart illustrating digital data of FIG. 5A, searched by using the template of FIG. 5E, according to embodiments of the present disclosure. In the embodiment of FIG. 6A, program instructions have executed to search the compressed digital video data of FIG. 5A for a number of sections of deleted digital data by using the template of FIG. 5E. The template of FIG. 5E finds compressed digital video data in data fields B2-B3, C2-C3, E5-F5, G2, and B7-G7, of the array of FIG. 5A.

Program instructions can execute to determine whether or not the compressed digital video data of FIG. 5A includes a subtractive digital pattern based on a subtractive digital patterning algorithm based on the template of FIG. 5E by using this result of searching the digital data in the embodiment of FIG. 6A. In the embodiment of 6A, since there is compressed digital video data at each of the search locations of the template, program instructions can determine that the compressed digital video data of FIG. 5A does not include a subtractive digital pattern based on the template of FIG. 5E.

FIG. 6B is a chart illustrating digital data of FIG. 5B, searched by using the template of FIG. 5E, according to embodiments of the present disclosure. In the embodiment of FIG. 6B, program instructions have executed to search the compressed digital video data of FIG. 5B for a number of sections of deleted digital data by using the template of FIG. 5E. The template of FIG. 5E finds an absence of digital data in data fields B2-B3, C2-C3, E5-F5, G2, and B7-G7, of the array of FIG. 5B.

Program instructions can execute to determine whether or not the compressed digital video data of FIG. 5B includes a digital pattern created by on a digital patterning algorithm based on the template of FIG. 5E by using this result of searching the digital data in the embodiment of FIG. 6B. In the embodiment of 6B, since there is an absence of digital data at each of the search locations of the template, program instructions can determine that the compressed digital video data of FIG. 5B includes a subtractive digital pattern based on the template of FIG. 5E.

FIG. 6C is a chart illustrating digital data of FIG. 5C, searched by using the template of FIG. 5E, according to embodiments of the present disclosure. In the embodiment of FIG. 6C, program instructions have executed to search the compressed digital video data of FIG. 5C for a number of sections of deleted digital data by using the template of FIG. 5E. The template of FIG. 5E finds an absence of digital data in data fields B2-B3, C2-C3, E5-F5, and G2, of the array of FIG. 5C. The template of FIG. 5E also finds replacement digital data in data fields B7-G7, of the array of FIG. 5C.

Likewise, with respect to FIG. 5C, program instructions can execute to determine whether or not the compressed digital video data of FIG. 5C includes a digital pattern created by a digital patterning algorithm based on the template of FIG. 5E by using this result of searching the digital data in the embodiment of FIG. 6C. In the embodiment of 6C, since there is either an absence of digital data or replacement digital data at each of the search locations of the template, program instructions can determine that the compressed digital video data of FIG. 5C includes a subtractive digital pattern based on the template of FIG. 5E and also includes replacement digital data. Program instructions can also execute to determine a source of the digital video data set by using the replacement digital data S-O-U-R-C-E, as illustrated in the embodiment of FIG. 6C.

FIG. 6D is a chart illustrating digital data of FIG. 5D, searched by using the template of FIG. 5E, according to embodiments of the present disclosure. In the embodiment of FIG. 6D, program instructions have executed to search the compressed digital video data of FIG. 5D for a number of sections of deleted digital data by using the template of FIG. 5E. The template of FIG. 5E finds an absence of digital data in data fields B2-B3, B7, F7-G7, and G2, of the array of FIG. 5D. The template of FIG. 5E also finds compressed digital video data in data fields C2-C3, C7-E7, and E5-F5, of the array of FIG. 5D.

Program instructions can execute to determine whether or not the compressed digital video data of FIG. 5D includes a digital pattern created by a digital patterning algorithm based on the template of FIG. 5E by using this result of searching the digital data in the embodiment of FIG. 6D. In the embodiment of 6D, since there is neither an absence of digital data nor replacement digital data at each of the search locations of the template, program instructions can determine that the compressed digital video data of FIG. 5D does not include a subtractive digital pattern based on the template of FIG. 5E.

A digital pattern can be extracted from digitally patterned data, in various ways. For example, in various embodiments of the present disclosure, program instructions can execute to digitally pattern digital data with blind patterning, semi-blind patterning, or private patterning. In blind digital patterning, program instructions can execute to extract a digital pattern by using a template. In semi-blind digital patterning, program instructions can execute to extract a digital pattern by using a template and a published version of the digital data set from which the digital pattern is to be extracted. In private digital patterning, program instructions can execute to extract a digital pattern by using a template and an original version of the digital data set from which the digital pattern is to be extracted.

Figure 7:
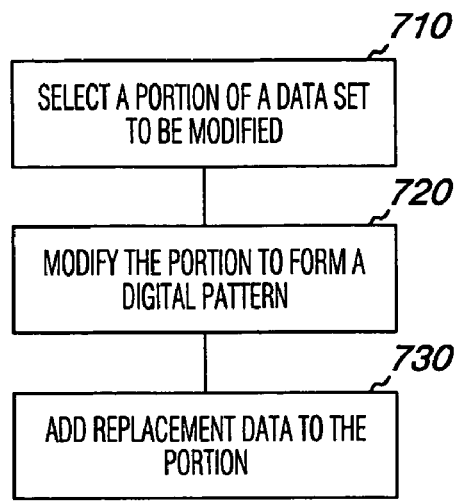
FIG. 7 is a flowchart illustrating embodiments of a method of subtractive digital modification, according to the present disclosure.
Figure 8:
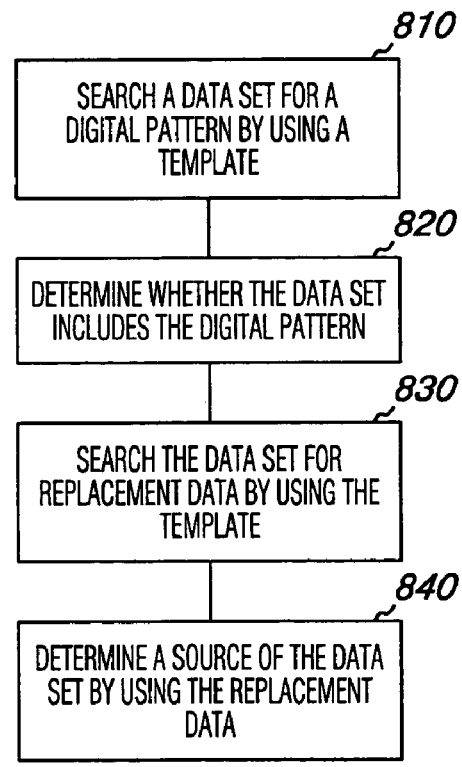
FIG. 8 is another flowchart illustrating embodiments of a method of subtractive digital modification, according to the present disclosure.

FIGS. 7-8 illustrate various method embodiments for subtractive digital patterning according to the present disclosure. Unless explicitly stated, the method embodiments described herein are not constrained to a particular order or sequence. Additionally, some of the described method embodiments or elements thereof can occur or be performed at the same point in time.

FIG. 7 is a flowchart illustrating embodiments of a method of digital patterning, according to the present disclosure. At block 710, program instructions can execute to select a portion of a digital data set to be modified. In various embodiments of the present disclosure, the digital data set can include various types and forms of digital data, including, but not limited to, compressed digital video data. Program instructions can also execute, as shown at block 720, to modify the portion selected at block 710 to form a digital pattern. In modifying the digital data, the digital data can be deleted, for example. At block 730, program instructions can execute to add replacement data to the portion deleted at block 720. However, various embodiments may not include an addition of replacement data. A digital pattern can, in some embodiments, be an imperceptible digital pattern.

FIG. 8 is another flowchart illustrating embodiments of a method of digital patterning, according to the present disclosure. At block 810, program instructions can execute to search a digital data set for a digital pattern by using a template. Program instructions can execute, at block 820, to determine whether or not the data set of block 810 includes the digital pattern, by using results of the search at block 810. At block 830, program instructions can also execute to search a digital data set for replacement data by using the template from block 810. In some embodiments of the present disclosure, as shown at block 840, program instructions can execute to determine a source of the data set of block 810 by using replacement data found at block 830.

As described above, program instructions can execute to perform digital patterning that can quickly generate smaller modified digital data sets that do not utilize additional downstream processing to execute. A digital pattern can also be an imperceptible digital pattern. As a result, digital patterning offers advantages in providing a digital pattern without altering the digital data in such a manner as to alter the perception of the data when executed.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure have more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
    selecting a portion of a compressed data set to be modified by using an algorithm; and
    modifying data of the portion of the compressed data set to form a modified compressed data set having a pattern imperceptible to unaided human sensory perception but identifiable by processing the modified compressed data set using the algorithm, wherein the pattern is based on a subtractive digital patterning that deletes portions of the compressed data set.

2. The method of claim 1, wherein the selecting includes selecting a portion that includes a number of sections of digital data distributed substantially throughout an original compressed digital data set.

3. The method of claim 1 further comprising, creating the pattern on a luminance component, a chrominance blue component, and chrominance red component of the modified compressed data.

4. The method of claim 1 further comprising, creating the pattern with a random number generator so the modified compressed data has random section lengths between one and ten words.

5. The method of claim 1, wherein the subtractive digital patterning deletes portions of digital data from bit planes of digital video data.

6. The method of claim 1 further comprising, generating the pattern to have digital data with different sections lengths patterned to repeat as a one word section followed by a two word section.

7. The method of claim 1, wherein the subtractive digital patterning reduces a sharpness of images generated from the modified compressed data set.

8. The method of claim 1 further comprising:
    deleting portions of the compressed data set to generate the pattern;
    executing the modified compressed data set such that frames of a resulting image are softer than frames of images resulting from the compressed data set before the subtractive digital patterning.

9. A computing device, comprising:
    a processor;
    a memory, connected to the processor; and
    means to generate a compressed digital data set and delete portions of the compressed digital data set to generate a pattern that is imperceptible to human sensory perception but identifiable by a computer device from an original compressed digital data set.

10. The device of claim 9, wherein a word of a chrominance blue component is deleted from a frame of the compressed digital data set.

11. A method, comprising:
    selecting a portion of a compressed data set to be deleted, by using a subtractive patterning algorithm; and
    deleting the portion of the compressed data set, to form a modified compressed data set having a subtractive pattern imperceptible to unaided human sensory perception but identifiable by processing the modified compressed data set using the subtractive patterning algorithm.

* * * * *